UNITED STATES PATENT OFFICE.

ABRAHAM STRAUB, OF MILTON, PENNSYLVANIA.

IMPROVED ASPHALTIC CEMENT.

Specification forming part of Letters Patent No. 40,649, dated November 17, 1863.

*To all whom it may concern:*

Be it known that I, ABRAHAM STRAUB, of Milton, county of Northumberland and State of Pennsylvania, have invented a new and useful Asphaltum Shale-Rock Cement; and I do hereby declare that the following is a full, clear, and exact description thereof.

My invention relates to a new cement for roofing, paving, and other purposes. It consists in a mixture of asphaltum (coal-tar) with a species of limestone, known as "shell" or "shale-rock" which is destitute of quartz and mica, and which, like the asphaltum, is found in considerable quantities in different localities. These ingredients, when united in a particular manner, hereinafter to be described, possess all the properties of a good cement, which is impenetrable by water and unaffected by air.

The following is a description of the mode of compounding the new cement. One part of undistilled or distilled coal-tar is put into a suitable vessel and allowed to boil for twenty minutes, or until a part of the naphtha or gaseous vapors escape and the liquid has become quite thick or viscous. To this boiling mass of coal-tar is added one part, or thereabout, of finely pulverized shale-rock, which should be thoroughly freed from moisture previously to introducing it into the coal-tar. The boiling of the two ingredients is continued until the desired hardness is obtained, which can be determined by taking out a small quantity of the composition and immersing it in cold water until it is cool, and these ingredients should be well stirred during the boiling process.

Although I have stated that the two ingredients may be mixed together in equal proportions, I do not confine myself to any definite quantity of each, as the proportions will vary according to the solidity required for the cement.

In regard to the species of shale-rock which I use, there being a great many varieties of shales, I will state that any fine-grained rock having a slaty structure which is found in the lias or secondary strata, and which does not contain quartz, gritty matter, or mica, may be used.

I am aware that pure clay has been used with coal-tar to make a cement, and this mixture I do not claim as my invention. The clay above referred to is used before it has undergone any change toward a hard or rocky state, and does not make as good cement when mixed with the coal-tar as the substance known as "shale-rock," which has undergone this change.

I claim—

The within-described cement when composed of the ingredients united substantially in the proportions herein specified, for the purpose set forth.

Witness my hand in the matter of my application for a patent for improved composition cement.

A. STRAUB.

Witnesses:
R. T. CAMPBELL,
E. SCHAFER.